US008794889B2

(12) United States Patent  
Aukzemas et al.

(10) Patent No.: US 8,794,889 B2
(45) Date of Patent: Aug. 5, 2014

(54) FLOATING CAPTIVE SCREW

(75) Inventors: Thomas V. Aukzemas, Wilmington, DE (US); Albert J. Frattarola, Swarthmore, PA (US); Boyd Wolf, Chadds Ford, PA (US); James F. Standish, III, Kennett Square, PA (US); Joseph N. Caulfield, Aston, PA (US)

(73) Assignee: Southco, Inc., Concordville, PA (US)

( * ) Notice: Subject to any disclaimer, the term of this patent is extended or adjusted under 35 U.S.C. 154(b) by 308 days.

(21) Appl. No.: 11/856,577

(22) Filed: Sep. 17, 2007

(65) Prior Publication Data

US 2008/0056844 A1 Mar. 6, 2008

Related U.S. Application Data

(63) Continuation of application No. 10/364,828, filed on Feb. 10, 2003, now abandoned, which is a continuation-in-part of application No. 09/803,221, filed on Mar. 9, 2001, now abandoned.

(60) Provisional application No. 60/188,406, filed on Mar. 10, 2000.

(51) Int. Cl.
F16B 41/00 (2006.01)
F16B 35/04 (2006.01)
F16B 31/04 (2006.01)

(52) U.S. Cl.
CPC ............. *F16B 41/002* (2013.01); *F16B 35/041* (2013.01); *F16B 31/04* (2013.01); *Y10S 411/999* (2013.01)
USPC ............................ 411/353; 411/107; 411/999

(58) Field of Classification Search
USPC .......................... 411/352, 353, 107, 999, 544
See application file for complete search history.

(56) References Cited

U.S. PATENT DOCUMENTS

| | | | | |
|---|---|---|---|---|
| 748,078 A * | 12/1903 | Keisling | ........................ | 292/251 |
| 2,201,793 A * | 5/1940 | Sanborn | ........................ | 292/251 |
| 2,967,557 A * | 1/1961 | Tait et al. | ....................... | 411/349 |
| 3,059,736 A * | 10/1962 | Boyd | .................................. | 403/7 |
| 3,180,389 A * | 4/1965 | Frank | ............................. | 411/350 |
| 3,204,680 A | 9/1965 | Barry | | |
| 3,209,806 A * | 10/1965 | Currier et al. | ................. | 411/361 |
| 3,250,559 A * | 5/1966 | Sommerfeld | ................. | 292/251 |
| 3,346,032 A * | 10/1967 | Bulent | .......................... | 411/349 |
| 3,426,819 A * | 2/1969 | Estes et al. | .................... | 411/360 |
| 3,437,119 A * | 4/1969 | Dey | ............................. | 411/349 |
| 3,465,803 A | 9/1969 | Swanstrom et al. | | |
| 3,502,130 A | 3/1970 | Gulistan | | |

(Continued)

FOREIGN PATENT DOCUMENTS

DE 29815492 U1 10/1998
WO WO0248557 6/2002

OTHER PUBLICATIONS

Southco North American Catalog 47, pp. C28 and C32.
Cardguard Heat Sink Photographs.

(Continued)

*Primary Examiner* — Flemming Saether
(74) *Attorney, Agent, or Firm* — RatnerPrestia

(57) ABSTRACT

A captive screw for securing together two panels has a screw and a spring extending between the screw head and a ferrule. A collar is formed on the screw shank under the ferrule to limit penetration of the screw threads in a bottom panel so that the upper panel floats on the spring.

16 Claims, 9 Drawing Sheets

(56) References Cited

U.S. PATENT DOCUMENTS

| | | | |
|---|---|---|---|
| 3,571,904 A * | 3/1971 | Gulistan | 29/443 |
| 3,614,799 A * | 10/1971 | Gulistan | 470/50 |
| 3,843,080 A | 10/1974 | Imai et al. | |
| 4,212,224 A * | 7/1980 | Bragg et al. | 411/337 |
| 4,387,497 A * | 6/1983 | Gulistan | 29/511 |
| 4,557,653 A | 12/1985 | Hill | |
| 4,720,223 A * | 1/1988 | Neights et al. | 411/11 |
| 4,915,557 A | 4/1990 | Stafford | |
| 5,059,075 A | 10/1991 | Kelly | |
| 5,384,940 A | 1/1995 | Soule et al. | |
| 5,462,395 A * | 10/1995 | Damm et al. | 411/107 |
| 5,475,564 A | 12/1995 | Chiou | |
| 5,558,480 A | 9/1996 | Kazino et al. | |
| 5,638,258 A | 6/1997 | Lin | |
| 5,662,163 A | 9/1997 | Mira | |
| 5,730,210 A | 3/1998 | Kou | |
| 5,738,531 A | 4/1998 | Beaman et al. | |
| 5,743,692 A | 4/1998 | Schwarz | |
| 5,755,276 A | 5/1998 | Chiou | |
| 5,757,621 A * | 5/1998 | Patel | 361/719 |
| 5,782,595 A * | 7/1998 | Schneider | 411/352 |
| 5,828,553 A | 10/1998 | Chiou | |
| 5,881,800 A | 3/1999 | Chung | |
| 5,901,039 A * | 5/1999 | Dehaine et al. | 361/704 |
| 5,903,434 A | 5/1999 | Chiou | |
| 5,999,402 A | 12/1999 | Jeffries et al. | |
| 6,025,994 A | 2/2000 | Chiou | |
| 6,055,159 A | 4/2000 | Sun | |
| 6,101,096 A | 8/2000 | MacGregor et al. | |
| 6,105,215 A | 8/2000 | Lee | |
| 6,109,158 A * | 8/2000 | Koelsch | 83/698.41 |
| 6,112,378 A | 9/2000 | Lee | |
| 6,157,539 A * | 12/2000 | Wagner et al. | 361/704 |
| 6,182,958 B1 | 2/2001 | Sidone et al. | |
| 6,246,584 B1 | 6/2001 | Lee et al. | |
| 6,250,375 B1 | 6/2001 | Lee et al. | |
| 6,282,761 B1 | 9/2001 | Bewley et al. | |
| 6,295,203 B1 | 9/2001 | Lo | |
| 6,307,748 B1 | 10/2001 | Lin et al. | |
| 6,309,156 B1 * | 10/2001 | Schneider | 411/353 |
| 6,311,765 B1 | 11/2001 | Lo et al. | |
| 6,318,452 B1 | 11/2001 | Lee | |
| 6,449,157 B1 * | 9/2002 | Chu | 361/704 |
| 6,679,666 B2 | 1/2004 | Mizuno et al. | |
| 6,786,691 B2 * | 9/2004 | Alden, III | 411/371.2 |
| 7,641,431 B2 * | 1/2010 | Luo et al. | 411/353 |

OTHER PUBLICATIONS

ITW Fastex Sales Print, 8033-00-9909, after Aug. 15, 2000.
Captive Fastener Spring Top Standoffs, p. 59.
Captive Fastener Self-Clinching Slide-Top Standoffs, p. 56.
Fairchild Fasteners, 1996 Product Guide, Index and pp. 1-11.
Web Page http://www.itw-fastex.com/cgi-bin/itwfastx/052, ITW Fastex, Oct. 17, 2002.
Web Page http://www.itw-fastex.com/newprods.htm, ITW Fastex, Aug. 21, 2001, 2 pages.
Photograph of IBM Heat Sink for IBM Xseries 345 Server, 2003.
Photographs of Heat Sink Captive Screw by Shuttle, 939 Radecki Court City of Industry, CA 91748, pp. 1 and 2, 2003.
Photographs of Swiftech MCX 603 Heat Sink, pp. 1 and 2, 2002.
Photograph of MSI Hermes 845 GV Heat Sink with Heat Sink Captive Screw with O-ring 2002.
Photographs of MSI Hermes 845 GV Heat Sink Captive Screw installed, 2002, pp. 1-2.

* cited by examiner

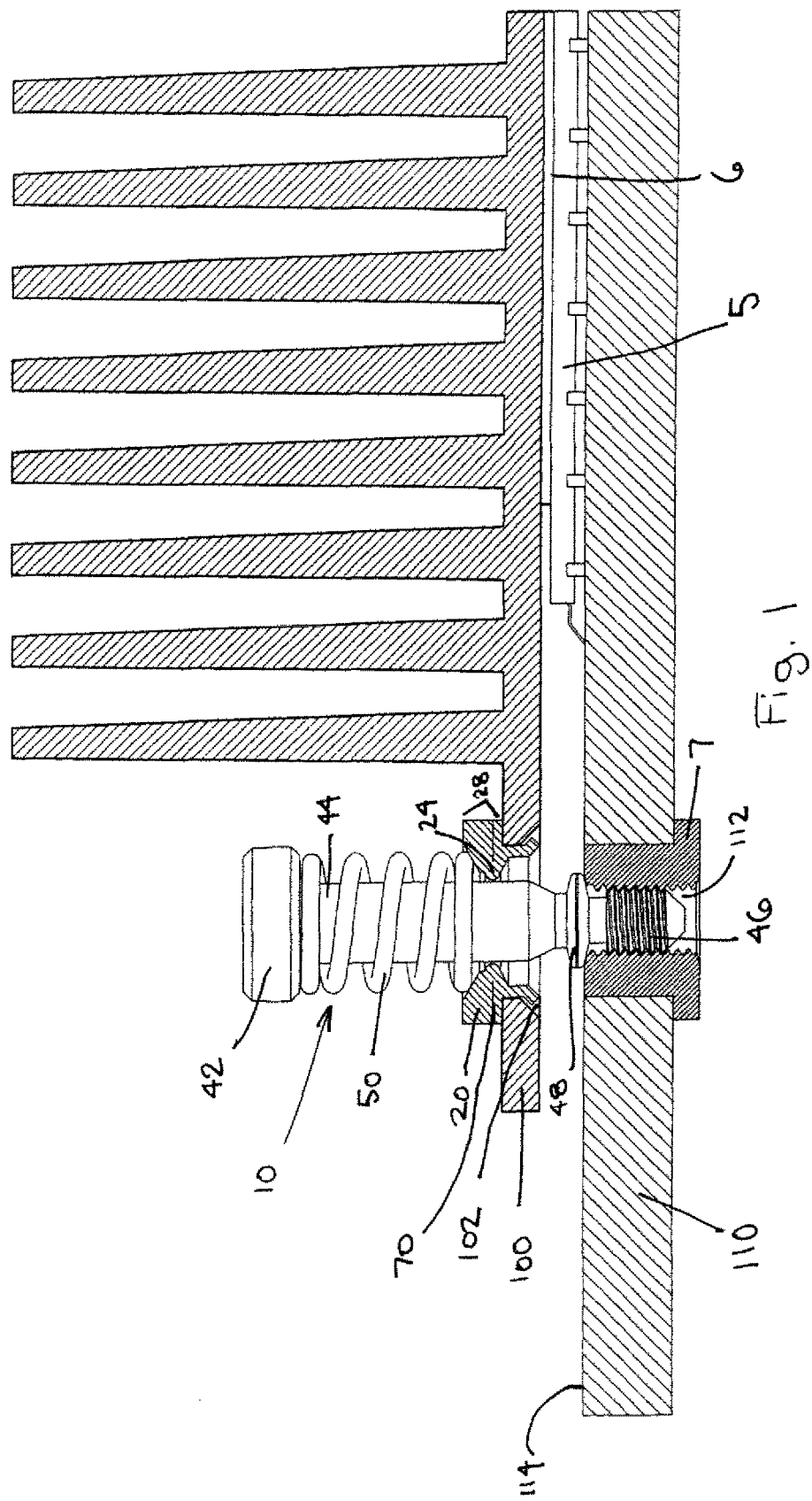

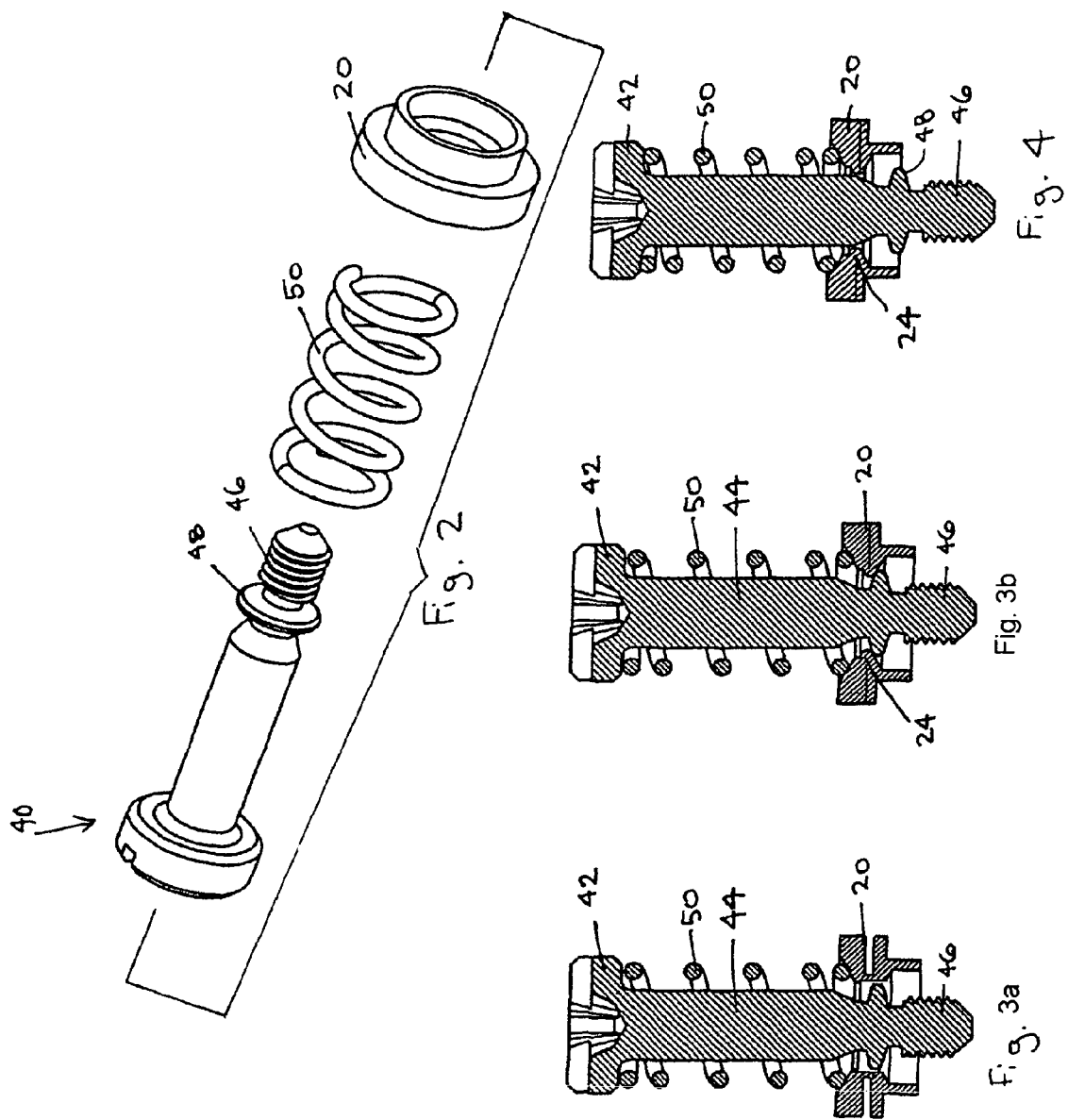

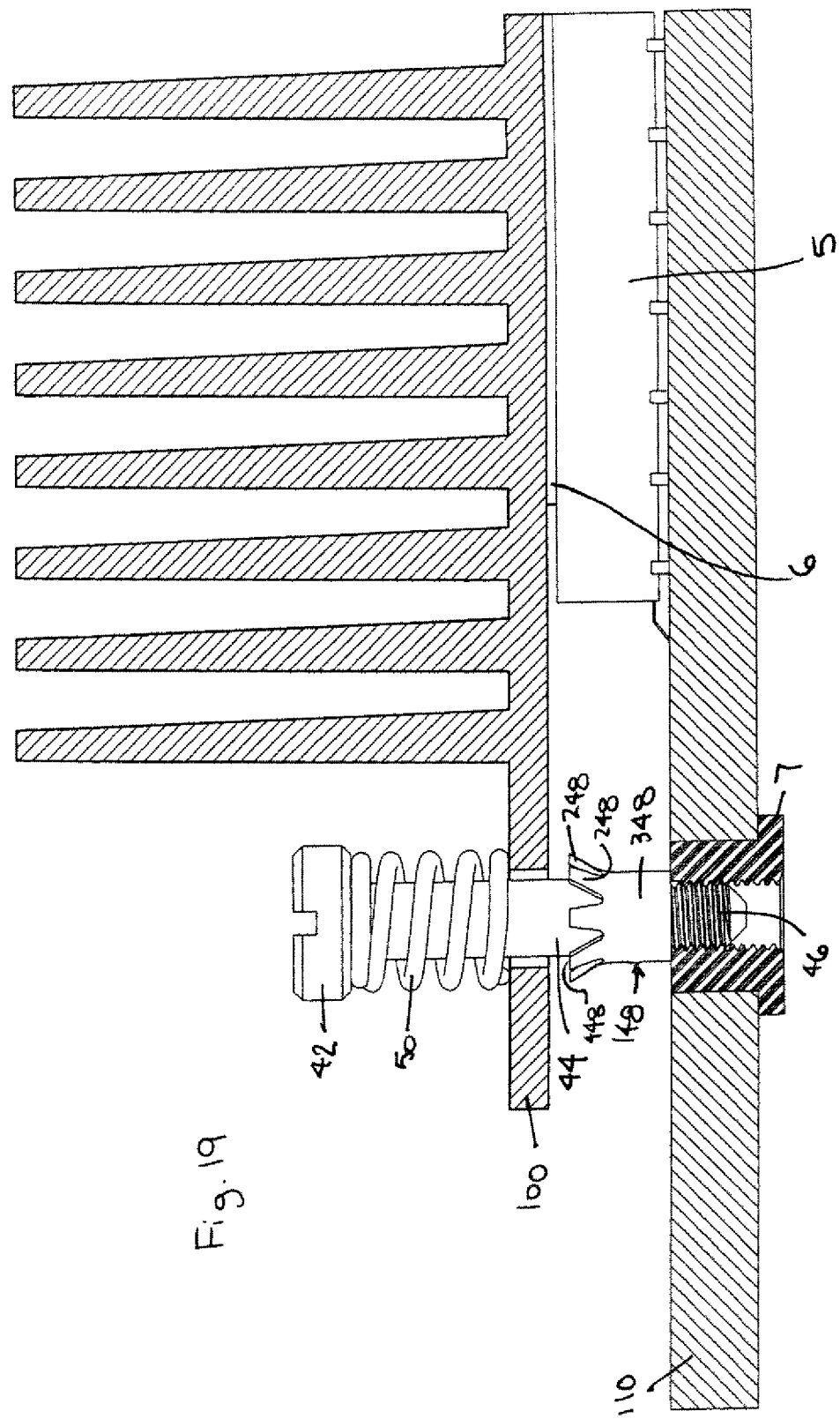

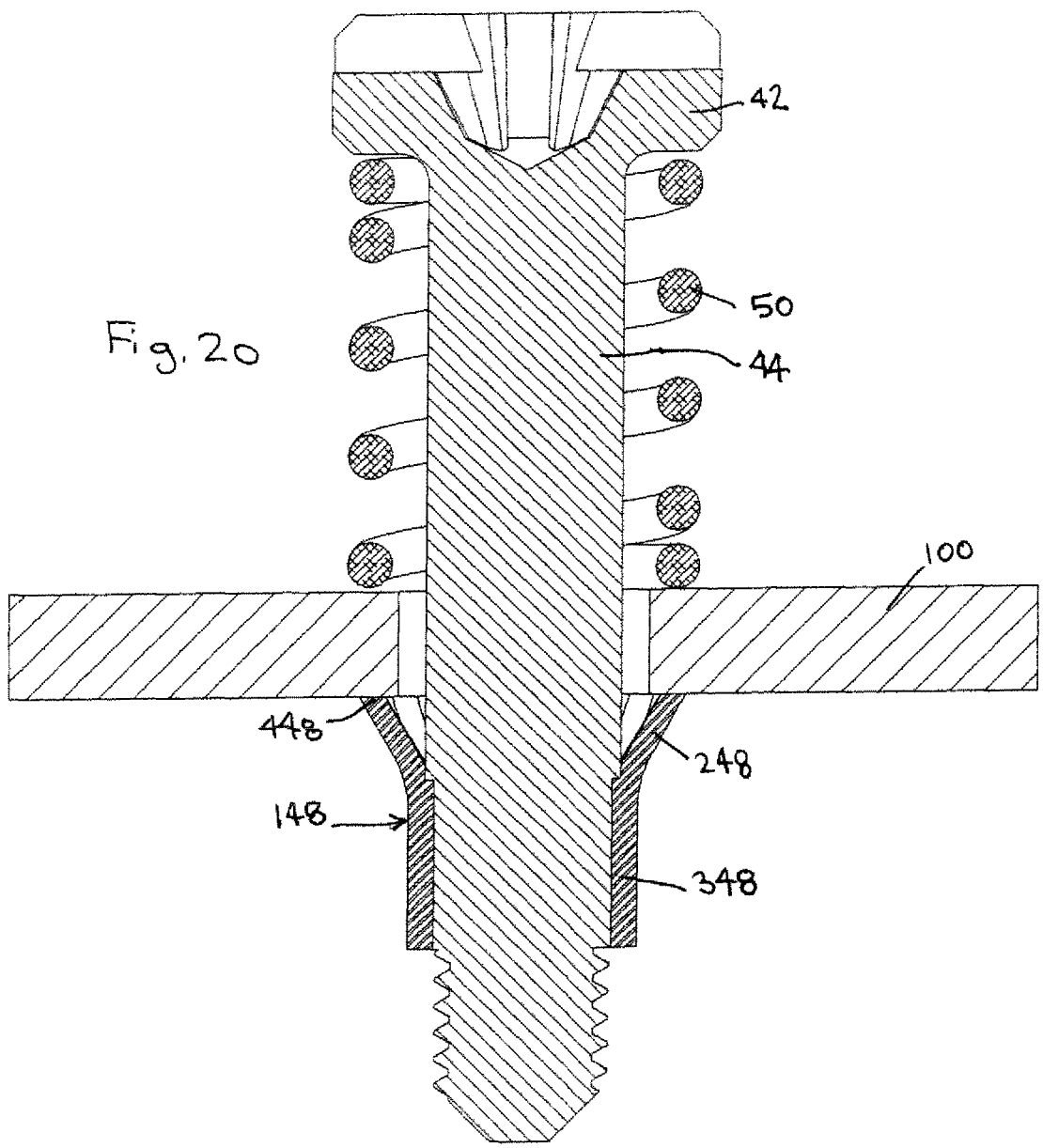

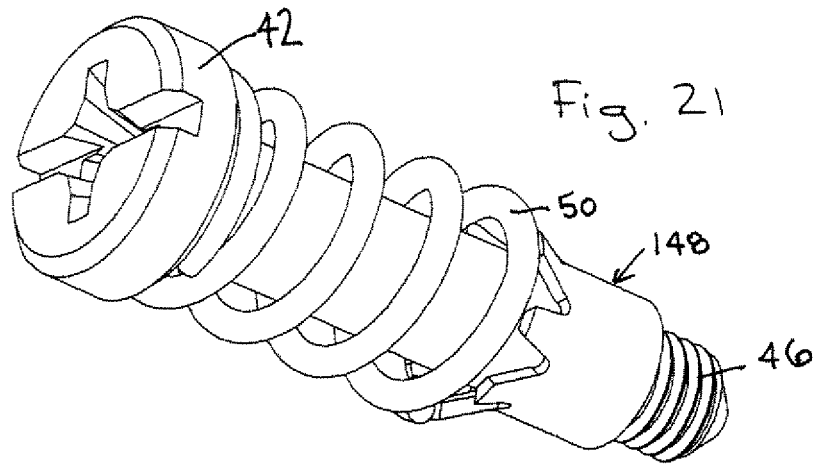
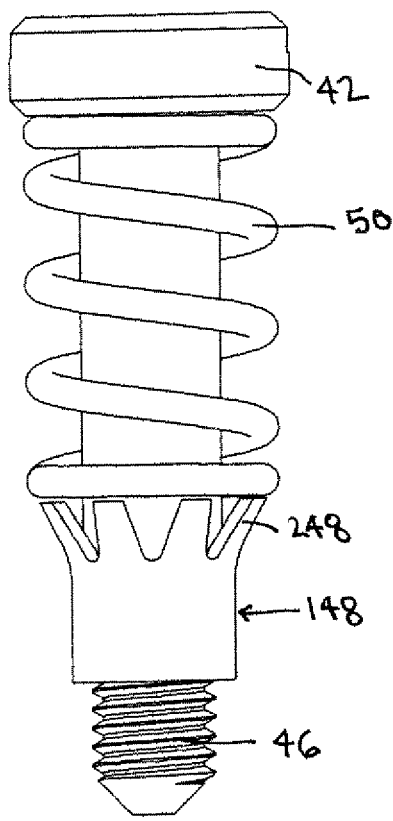
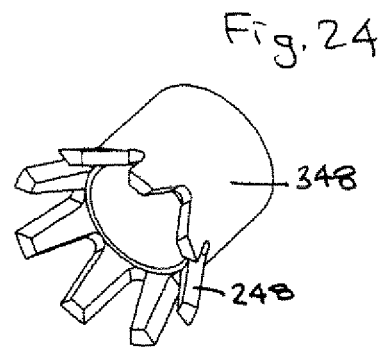
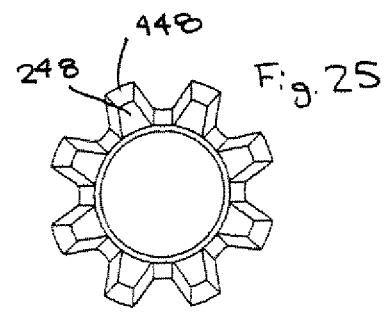
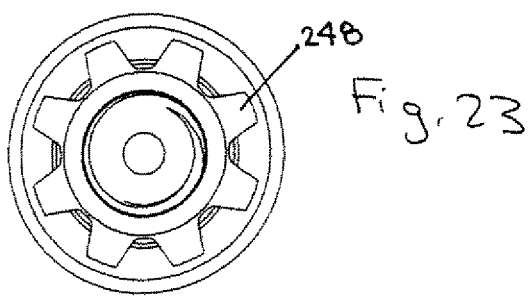

FLOATING CAPTIVE SCREW

CROSS REFERENCE TO RELATED APPLICATIONS

This application is a continuation of U.S. patent application Ser. No. 10/364,828, filed Feb. 10, 2003, which is incorporated herein by reference in its entirety and which is a continuation-in-part of U.S. patent application Ser. No. 09/803,221, filed Mar. 9, 2001, which claims the benefit of U.S. Provisional Application for Patent Ser. No. 60/188,406, filed Mar. 10, 2000.

BACKGROUND OF THE INVENTION

1. Field of the Invention

The present invention relates generally to captive screws.

2. Brief Description of the Prior Art

Captive screws are screws that are "captivated" or held within a collar or ferrule. The ferrule is mounted in a first panel or like object. The screw portion is captivated so that it can be moved perpendicular to the first panel and the screw's threads can engage a corresponding aperture in a second panel, so that the first and second panels can be secured together. However, when the panels are unscrewed and disengage, the screw is retained in the first panel. Captive screws are useful in applications where it is important to avoid dropping or losing screws during assembly or repair, such as electronic devices, where a lost screw can cause catastrophic electrical shorts damaging equipment.

One particular application for captive screws is to hold down a heat sink which is mounted on top of a microchip and is intended to dissipate the heat of the microchip. The microchip, in turn, is fastened to a circuit board. Oftentimes, between the heat sink and the microchip a compressible or elastic material in the form of the sheet is placed. If one were to put the heat sink directly on top of the microchip, there would be tiny gaps between the two. Since air conducts heat poorly, these gaps have a detrimental effect on heat transfer. This interface material in the form of a sheet is needed and the sheet has a high thermal conductivity. Recently, microchips during operation have been getting warmer and warmer as space has been getting more and more limited on circuit boards. Accordingly, heat sinks have been getting larger and larger as the requirements for withstanding vibrations has been getting more stringent. Standoffs have been used which rise from the board to which the heat sinks are screwed down. Difficulties encountered with standoffs have been that the standoffs do not compensate for chip height variation and they do not provide consistent compression of the interface material between the chip and the heat sink.

In the past, various clamps, latches, pins, etc have been used to hold heat sinks down. Plastic clips have been used, however, this requires that the use of a screwdriver to screw in the clip directly onto the circuit board which makes the board susceptible to damage. Plastic clips, although they are not costly, are limited by the weight of the heat sink and the clips have proven to be unreliable in vibration and drop shock testing. Some varieties of clips are clipped onto the heat sink at the ends of fins in the middle of the heat sink. Unfortunately, the middle fins are the most important fins in a heat sink as they carry most of the heat load. Therefore, when such clips are used the need for a larger heat sink results.

Accordingly, a need exists for a captive screw which is captive or fixed to a first panel such as a heat sink whereby a collar on the screw bottoms out at a fixed distance on a lower panel when the screw is screwed into the lower panel thereby allowing the captive screw to provide a constant pressure on the top panel. In addition, the captive screw should be able to pass stringent vibration testing and be able to allow for thermal expansion.

The present invention has been developed in view of the foregoing and to overcome the deficiencies of the prior art.

SUMMARY OF THE INVENTION

The present invention solves the problem of providing for secure fastening of a lower panel to an upper panel while providing a constant pressure on an upper panel to which the captive screw is captive.

In one embodiment of the present invention, a captive screw is disclosed which includes a ferrule, a screw, and a spring. The screw has a head, a shank adapted to pass through the ferrule, a threaded portion at the end of the shank opposite the head, and a collar formed on the shank proximate the threaded portion. The screw is captivated on the ferrule between the head and the collar. The spring extends on the shank of the screw between the head and the ferrule. Preferably, the ferrule has a generally cylindrical exterior surface having a plurality of knurls for securing the captive screw in a preformed aperture in a first structure, such as a lever. Is also preferred that the ferrule be formed with an inner ring formed on the interior surface of the ferrule having a generally circular opening large enough to permit the threads collar the screw to pass through but not large enough to permit the spring to pass through.

In a second embodiment of this invention, the ferrule has an annular lip and an exterior circumferential exterior groove. Preferably, the annular lip and exterior groove permit the captive screw to be press fit in a structure.

In a third embodiment of the present invention, the ferrule of the captive screw has a first and a second annular lip which provide for the captive screw to be pressed into a structure.

In a fourth embodiment of the present invention, a captive screw is provided which has a collar connected to the shank of the screw in the proximity of the threaded portion of the screw. The collar has outwardly extending legs.

BRIEF DESCRIPTION OF THE DRAWINGS

FIG. 1 is a side elevational view of a first embodiment of a captive screw according to the present invention, partially in section in a heat sink and a circuit board.

FIG. 2 is an exploded perspective view of a first embodiment of the screw of the captive screw of FIG. 1.

FIG. 3a is a side elevational cross-sectional view of the captive screw of FIG. 1 in an unfastened position prior to deformation.

FIG. 3b is a side elevational cross-sectional view of the captive screw of FIG. 1 in an unfastened position post deformation.

FIG. 4 is a side elevational cross-sectional view of the captive screw of FIG. 1 in a fastened position post deformation.

FIG. 19 is a side elevational view of a fourth embodiment of a captive screw according to the present invention, partially in section in a heat sink and a circuit board.

FIG. 20 is a side elevational view of the captive screw of FIG. 19 partially in section in a structure.

FIG. 21 is a perspective view of the captive screw of FIG. 19.

FIG. 22 is a side elevational view of the captive screw of FIG. 19.

FIG. 23 is a bottom view of the captive screw of FIG. 19.

FIG. 24 is a perspective view of the collar of the captive screw of FIG. 19.

FIG. 25 is a perspective view of the collar of the captive screw of FIG. 19.

DETAILED DESCRIPTION

Figure 6:
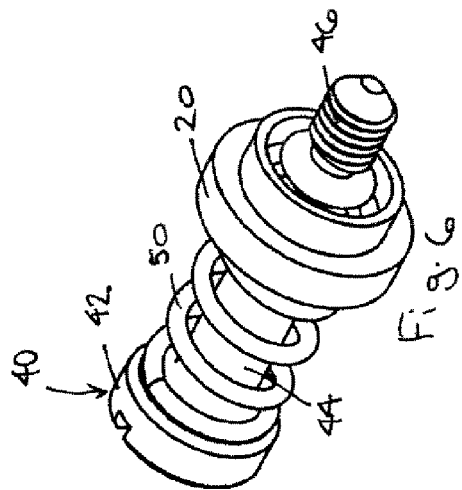
FIG. 6 is an isometric view of the captive screw of FIG. 1 in a fastened position.

The present invention provides a captive screw for securing a first structure such as a first panel or heat sink to a second structure such as a circuit board.

Referring now to the drawings in detail, wherein like reference numerals indicate like elements throughout the several views, there is shown in FIG. 1 a captive screw 10 according to the present invention. The captive screw 10 includes a ferrule 20, a screw 40 and a spring 50. The screw 40 (FIG. 2) includes a head 42 adapted to receive a driver (FIG. 3), a shank 44 adapted to pass through the ferrule 20, and a threaded portion 46 at the end of the shank 44 opposite the head 42. The 40 screw also includes a collar 48 formed on the shank 44 proximate the threaded portion 46.

The generally cylindrical ferrule 20 can have a plurality of knurls formed on its exterior cylindrical surface for securing the captive screw 10 in a preformed aperture 102 in a first structure 100 such as a heat sink by a press fit. The threaded portion 46 of the screw 40 is intended for securing the captive screw 10 in a preformed, threaded aperture 112 formed in second structure 110 such as a circuit board shown in FIG. 1 having a chip 5. The chip is shown on a sheet 6 of flexible material which absorbs vibrations. The captive screw 10 is positioned precisely relative to the second structure by virtue of the collar 48 formed on the shank 44 of the screw 40. The collar 48 limits the depth of penetration of the screw 40 into a threaded insert 7 which has been inserted from the bottom of the circuited board 112. Alternatively, the threaded portion of the captive screw can be screwed directly into a preformed, threaded aperture in a second structure. By coming into contact with the threads of threaded insert 7, the screw 40 is being rotationally driven into the second structure.

As can be seen in the FIGS. 1, 3 and 4, the ferrule 20 is formed with an annular ring section 24. The captive screw 10 is assembled by placing the spring 50 on the screw 40 and then passing the screw 40 through the ferrule 20. The annular ring 24 on the interior surface of the ferrule is large enough to permit the threads 46 of the screw 40 to pass through but not large enough to permit the spring 50 to pass through. When the ferrule 20 is formed during assembly, pressure can be applied uniformly on the generally cylindrical portion of the ferrule and plastic deformation can form the annular ring 24. Prior to the pressure being applied to the ferrule the ferrule can have an annular circumferential groove which allows for the formation of the ring section. The annular ring section 24 reduces the size of the opening in the ferrule so that the resultant opening is slightly larger than the diameter of the screw shaft 44 but smaller than both the screw head diameter and the diameter of the collar 48, thus captivating the screw 40 on the ferrule 20 in between the screw head 42 and the collar 48. The collar 48 can be rolled onto the screw after the screw has been inserted into the ferrule. Collar 48 has a tapered top surface and a tapered bottom surface. After installation of the ferrule into the first structure 100 the end of the ferrule can be flared. The tapered top surface of the collar 48 mates with the tapered annular section 24 of the ferrule 20.

Figure 8:
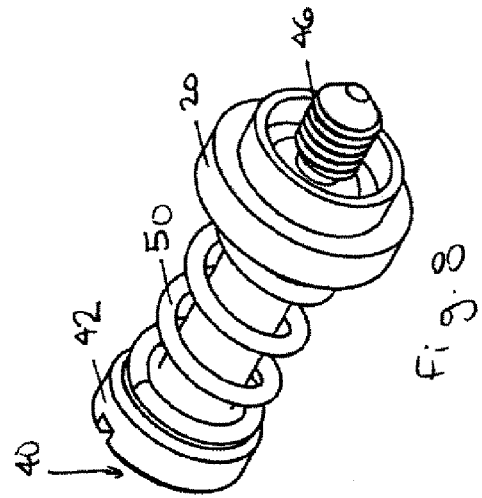
FIG. 8 is a perspective view of the captive screw of FIG. 1 in an unfastened position.
Figure 5:
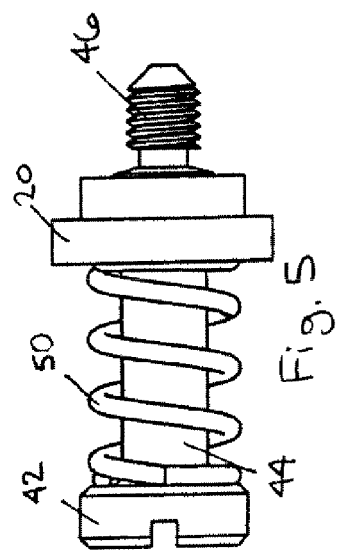
FIG. 5 is a side view of the captive screw of FIG. 1 in a fastened position.
Figure 7:
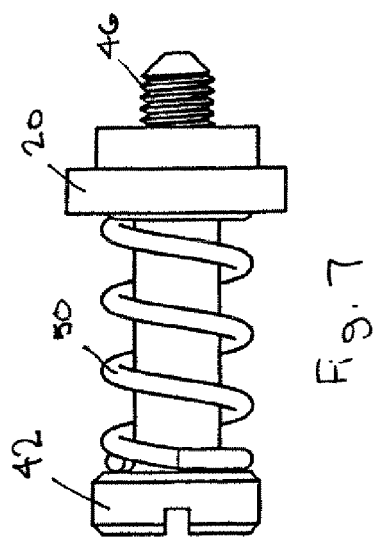
FIG. 7 is a side view of the captive screw of FIG. 1 in an unfastened position.
Figure 9:
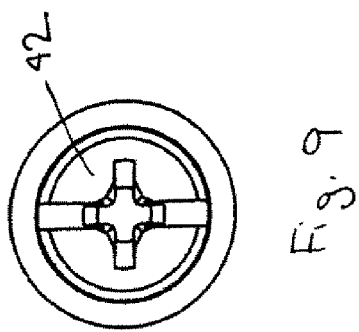
FIG. 9 is a top plan view of the captive screw of FIG. 1.
Figure 11:
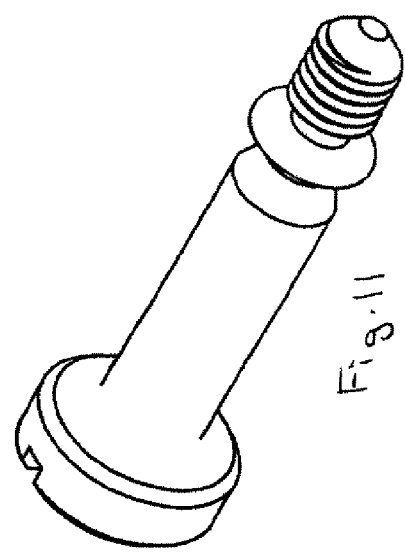
FIG. 11 is a perspective view of the screw in the captive screw of FIG. 1.
Figure 15:
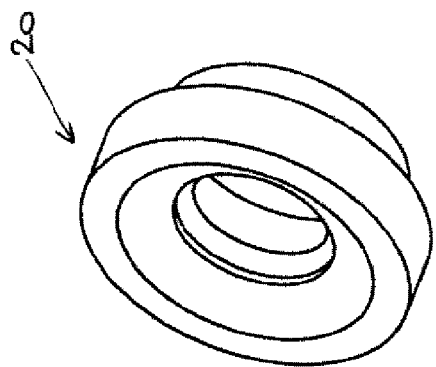
FIG. 15 is a perspective view of the ferrule in the captive screw of FIG. 1.
Figure 10:
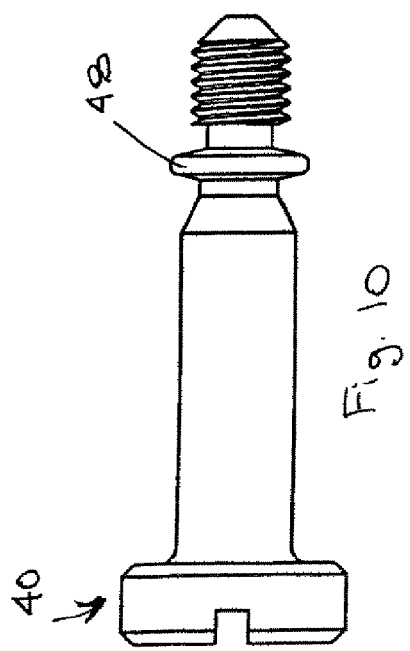
FIG. 10 is a side view of the screw in the captive screw of FIG. 1.
Figure 14:
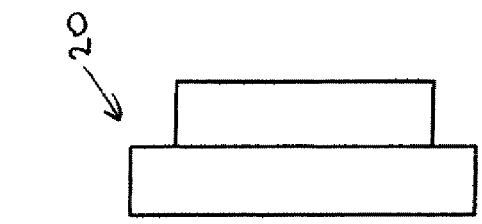
FIG. 14 is a side view of the ferrule in the captive screw of FIG. 1.
Figure 13:
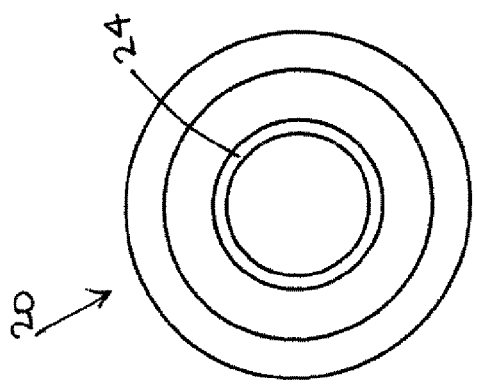
FIG. 13 is a top view of the ferrule in the captive screw of FIG. 1.
Figure 12:
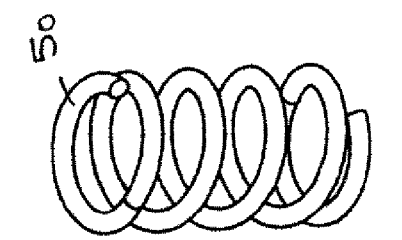
FIG. 12 is a perspective view of the spring in the captive screw of FIG. 1.

The ferrule 20 also has an annular lip 28 or stop formed on the exterior cylindrical surface proximate the top of the ferrule 20 for limiting the penetration of the ferrule 20 in the preformed aperture 102 in the first structure 100. When the captive screw of 10 the present invention is installed, the collar 48 precisely limits the vertical position of the screw 40 above the second structure 110, while the first structure 100 floats above the second structure 110, while being urged towards the second structure 110 by the spring 50 of the captive screw 10. For example, FIG. 6 is a perspective view of the captive screw of the first embodiment of the invention showing the position of the screw when the screw is in a fastened position. FIG. 8 is a perspective view of the captive screw of the first embodiment of the invention showing the position of the screw when the screw is in a fastened position.

Figure 16:
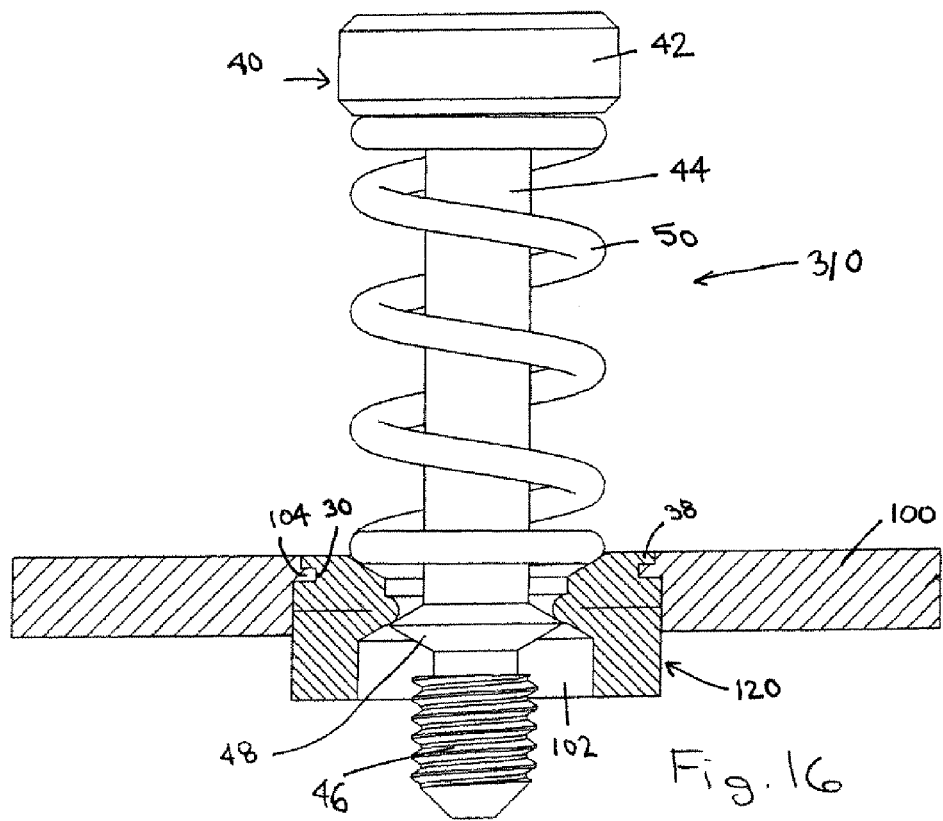
FIG. 16 is a side elevational view of a second embodiment of the captive screw of the present invention partially in section.

In the second embodiment of the invention as shown in FIG. 16, the ferrule 120 also has an annular lip 38 or stop formed on the exterior cylindrical surface proximate the top of the ferrule 120 for limiting the penetration of the ferrule 120 in the preformed aperture 102 in the first structure, as well as an annular circumferential groove 30 formed in the exterior cylindrical surface of the ferrule immediately adjacent and below the annular lip 38, for receiving the plastic flow of material 104 when the ferrule 120 is pressed into the preformed aperture. When the captive screw of 310 the present invention is installed, the collar 48 precisely limits the vertical position of the screw 40 above the second structure (not shown), while the first structure 100 floats above the second structure, while being urged towards the second structure by the spring 50 of the captive screw 310. The captive screw shown in FIG. 1 can be pressed into the underside of the first structure from the bottom. Alternately, the captive screw shown could be installed from the top when groove 30 is placed near the bottom of the first structure 30. Also, the collar of the second embodiment can be shaped as part of the screw after the screw has been inserted in the ferrule.

Figure 17:
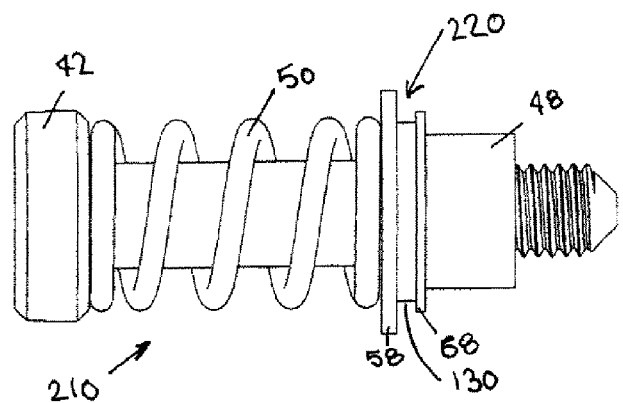
FIG. 17 is a side view of a third embodiment of the captive screw of the present invention.
Figure 18:
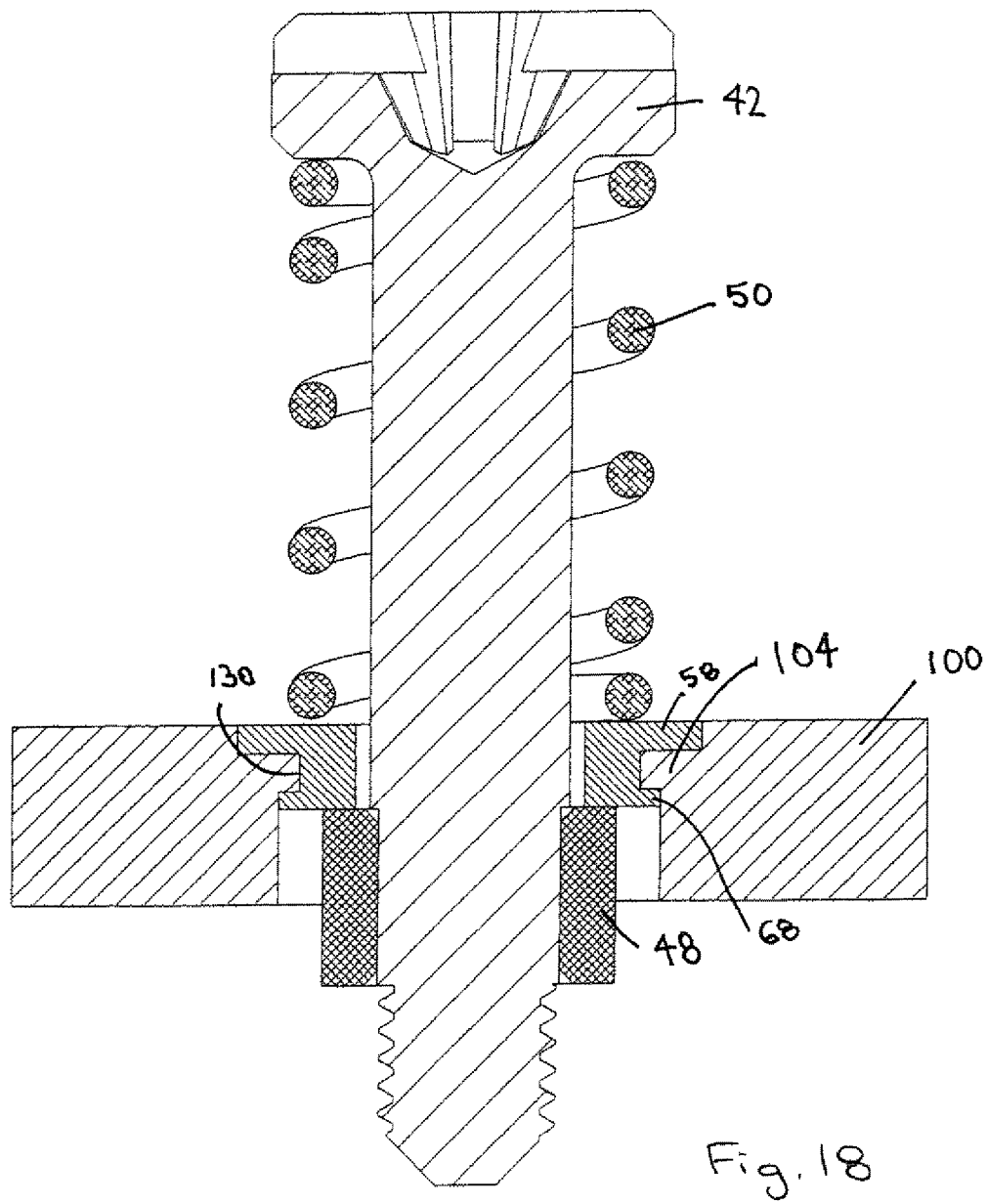
FIG. 18 is a side elevational view of the captive screw of FIG. 17 partially in section in a structure.

In the third embodiment of the invention as shown in FIGS. 17 and 18, the ferrule 220 also has a first annular lip 58 or stop formed on the exterior cylindrical surface proximate the top of the ferrule 220 for limiting the penetration of the ferrule 220 in the preformed aperture 102 in the first structure, as well as an annular circumferential groove 130 formed in the exterior cylindrical surface of the ferrule immediately adjacent and below the first annular lip 58, for receiving the plastic flow of material 104 when the ferrule 220 is pressed into the preformed aperture. A second annular lip 68 is shown at the opposite end of the ferrule. When the captive screw of 210 of the present invention is installed, the collar 48 precisely limits the vertical position of the screw 40 above the second structure (not shown), while the first structure 100 floats above the second structure, while being urged towards the second structure by the spring 50 of the captive screw 210. In this embodiment of the present invention the collar can be pressed on.

In the fourth embodiment, FIGS. 19, 20, 21 and 22 show a captive screw in first structure 100 having a collar 148 which has outwardly extending legs and a base portion. The collar has outwardly extending legs 248 and the base portion 348. The ends 448 of the legs 248 extend outwardly and define a collar cross section. Since the legs are flexible, the ends of the legs deform elastically and permit the collar to pass through a first structure when being passed through an aperture in a structure and the aperture has a smaller cross section than that defined by the ends of the legs. The arrangement shown in FIG. 19 is one way in which to install the collar 48 into a second structure 110. The base portion 348 of the collar limits the penetration of the screw into the second structure. In the embodiment shown in FIG. 20 the ends 448 of the legs contact the underside of the first structure. The collar can be in the shape of a crown and the collar can be threaded on, crimped on or pressed on, etc. The legs are also dimensioned and configured to not allow the spring to pass over the legs.

The collar shown and described in the first three embodiments can be rolled on pressed on or screwed on.

The screw in the above embodiments includes a generally cylindrical head 42 having a central recess 34 formed therein and adapted to receive a driver. While a Phillip-type driver recess is illustrated, other types of driver recesses, such as slotted, Torx®, hexagonal, and the like, and combinations thereof (e.g. slot-Torx), can also be used. A generally cylindrical upper section extends coaxially downward from the head 42.

Preferably, the screw, and ferrule are formed from a suitable metallic material such as aluminum.

While the ferrule of the present invention is adapted to be press fit into the first structure, other means of mounting the captive screw on the structure can be employed, including conventional installation methods known as "flare-in," "floating," "p.c. board," and "snap-in" installation methods.

Various other modifications can be made in the details of the various embodiments of the apparatus of the present invention, all within the scope and spirit of the invention and defined by the appended claims.

We claim:

1. A floating captive screw capable of being mounted in a preformed first aperture of a first panel, being a microcircuit heat sink flange, for attachment to a second aperture in a second panel, being a PC board, said captive screw comprising:
   a ferrule having a generally cylindrical portion having an inner bore with an inner annular ring on the interior surface of said bore, said ferrule being adapted to be received into said first aperture of said first panel wherein said ferrule has a plurality of securing knurls engaging said first panel;
   a screw having a head, a shank and a threaded portion at the end of the shank opposite the head, said shank and said threaded portion being adapted to pass through said ferrule bore;
   wherein said inner annular ring is formed by plastic deformation of material during assembly wherein pressure is applied uniformly on the generally cylindrical exterior portion of the ferrule to form said inner annular ring, wherein said ferrule has a collapsed annular circumferential groove which allowed the formation of the ring;
   a collar being fixed on said shank at a position between said inner annular ring of said ferrule bore and the screw threaded portion after said screw shank and said threaded portion have passed through the ferrule bore, wherein said collar limits penetration of the screw when engaging said second panel and wherein said collar captivates said screw to said ferrule;
   a spring positioned over said screw shank between said head and said inner annular ring; and
   wherein said collar is formed by being rolled onto said screw shank under the ferrule to limit penetration of the screw threads in the second panel so that the first panel floats on the spring.

2. The captive screw according to claim 1 wherein the inner annular ring forms a generally circular opening in the ferrule, and wherein said collar has a tapered top surface and a tapered bottom surface.

3. The captive screw according to claim 2 wherein the ferrule has an annular lip formed on the exterior cylindrical surface proximate the top of the ferrule for limiting the penetration of the ferrule in the preformed aperture in the first structure.

4. The captive screw according to claim 2 wherein: said ferrule has a first and a second opposed ends and an annular lip at one of the first and second opposed ends and an annular circumferential exterior groove adjacent the annular lip.

5. The captive screw according to claim 4 wherein the annular lip and the circumferential exterior groove are dimensioned and configured for pressing the ferrule into a panel and securing the captive screw in a preformed aperture in a first structure.

6. The captive screw according to claim 4 wherein the end of the ferrule at which the annular lip is located faces the screw head, and wherein the ferrule is of aluminum material.

7. The captive screw according to claim 4 wherein the end of the ferrule at which the annular lip is located faces the threaded portion of the screw, and wherein the ferrule is of metallic material.

8. The captive screw according to claim 4 wherein the inner annular ring forms a generally circular opening.

9. The captive screw according to claim 4 wherein the annular lip and the circumferential exterior groove are dimensioned and configured for pressing the ferrule into a panel and securing the captive screw in a preformed aperture in a first structure.

10. The captive screw according to claim 4 wherein the first annular lip is located at the end of the ferrule closest to the head of the screw and extends outwardly away from the ferrule farther than the second annular lip extends outwardly away from the ferrule.

11. The captive screw of claim 1 in combination with a heat sink.

12. The captive screw of claim 1 wherein the inner annular ring is dimensioned such that the inner annular ring does not permit movement of the collar past the inner annular ring.

13. The captive screw of claim 1 wherein the collar is pressed onto the shank of the screw.

14. The captive screw of claim 1 in combination with a threaded insert, the threaded insert being internally threaded for receiving the threaded portion of the captive screw, wherein the captive screw is dimensioned and configured for attaching a first panel to a second panel having an aperture dimensioned and configured for receiving the threaded insert.

15. A combination comprising a captive screw and a threaded insert, the captive screw having a head, a shank and a threaded end portion and being capable of being mounted in a first preformed aperture of a first panel, the first panel being a heat sink flange, and attached to a second panel, the second panel being a PC board, having a second preformed aperture wherein a circuit structure is adapted to be present between the first and second panels, the threaded insert being internally threaded for receiving the threaded end portion of the captive screw, the threaded insert being capable of being received by the second preformed aperture, the combination further comprising:

a metallic ferrule being adapted to be pressed into said first preformed aperture having a generally cylindrical portion and having an inner annular ring on an interior surface of the ferrule, wherein said inner annular ring is formed by a plastic deformation of said metallic material during assembly wherein pressure is applied uniformly on the generally cylindrical portion of the ferrule, said ferrule having a collapsed annular circumferential groove which facilitated said annular ring formation;

a chip on a sheet of flexible material of high thermal conductivity which absorbs vibrations;

a spring extending on the shank of the screw between the screw head and the ferrule; and wherein said screw shank and threaded end portion are adapted to pass through the ferrule after said ferrule is pressed into the first preformed aperture, wherein the screw shank is adapted to receive and hold a collar, the collar being fixed on the shank after the shank and threaded portions have passed through the ferrule for predetermining a desired position of said screw so that the first panel is held down with a predetermined spring floating force.

16. The combination of claim 15 wherein said ferrule has a first and a second opposed ends and an annular lip at one of the first and second opposed ends and an annular circumferential exterior groove adjacent the annular lip.

* * * * *